and comprises a seat body (12) including a
United States Patent [19]

Brittian et al.

[11] Patent Number: 5,118,163
[45] Date of Patent: Jun. 2, 1992

[54] CHILD RESTRAINT SEAT FOR AN AIRCRAFT

[76] Inventors: Lucille J. Brittian; William D. Brittian, both of 6813 Woodview Dr., Knoxville, Tenn. 37920

[21] Appl. No.: 694,663

[22] Filed: May 2, 1991

[51] Int. Cl.⁵ ............................................. A47C 1/08
[52] U.S. Cl. .................................... 297/250; 297/254
[58] Field of Search ............... 297/250, 254, 467, 468, 297/484, 485, 488

[56] References Cited

U.S. PATENT DOCUMENTS

| | | |
|---|---|---|
| 188,895 | 9/1877 | Joines . |
| 470,381 | 3/1892 | Huber . |
| 735,070 | 8/1903 | Davidson . |
| 741,077 | 10/1903 | Smith . |
| 778,223 | 12/1904 | Cox . |
| 1,185,482 | 5/1916 | Cockerille . |
| 1,211,108 | 1/1917 | Douglas . |
| 1,236,316 | 8/1917 | Kelly . |
| 1,328,105 | 1/1920 | Smith . |
| 1,496,693 | 6/1924 | Waddill . |
| 3,107,942 | 10/1963 | Rivkin .............................. 297/254 |
| 3,144,272 | 8/1964 | Yadven ......................... 297/254 X |
| 3,515,431 | 6/1970 | Grady ................................. 297/250 |
| 4,640,545 | 2/1987 | von Wimmersperg . |
| 4,743,063 | 5/1988 | Foster ........................... 297/250 X |

FOREIGN PATENT DOCUMENTS 4500133 2/1985 Japan .

Primary Examiner—Laurie K. Cranmer
Attorney, Agent, or Firm—Pitts and Brittian

[57] ABSTRACT

A child restraint seat for an aircraft. The child restraint seat (10) is designed to be releasably secured to a support structure of the aircraft, such as the under support structure (34) of a passenger seat (32) or a cabin partition (60), and comprises a seat body (12) including a lower seat portion (14) for supporting the child and a back portion (16) for supporting the back of the child. The lower seat portion (14) defines a seat bottom (18) for supporting the child restraint seat (10) on the floor of the aircraft. A child restraint harness (22) is provided for securing the child in a seated position in the seat body (12), and an apparatus for releasably securing the seat body (12) to the support structure of the aircraft is also provided.

16 Claims, 5 Drawing Sheets

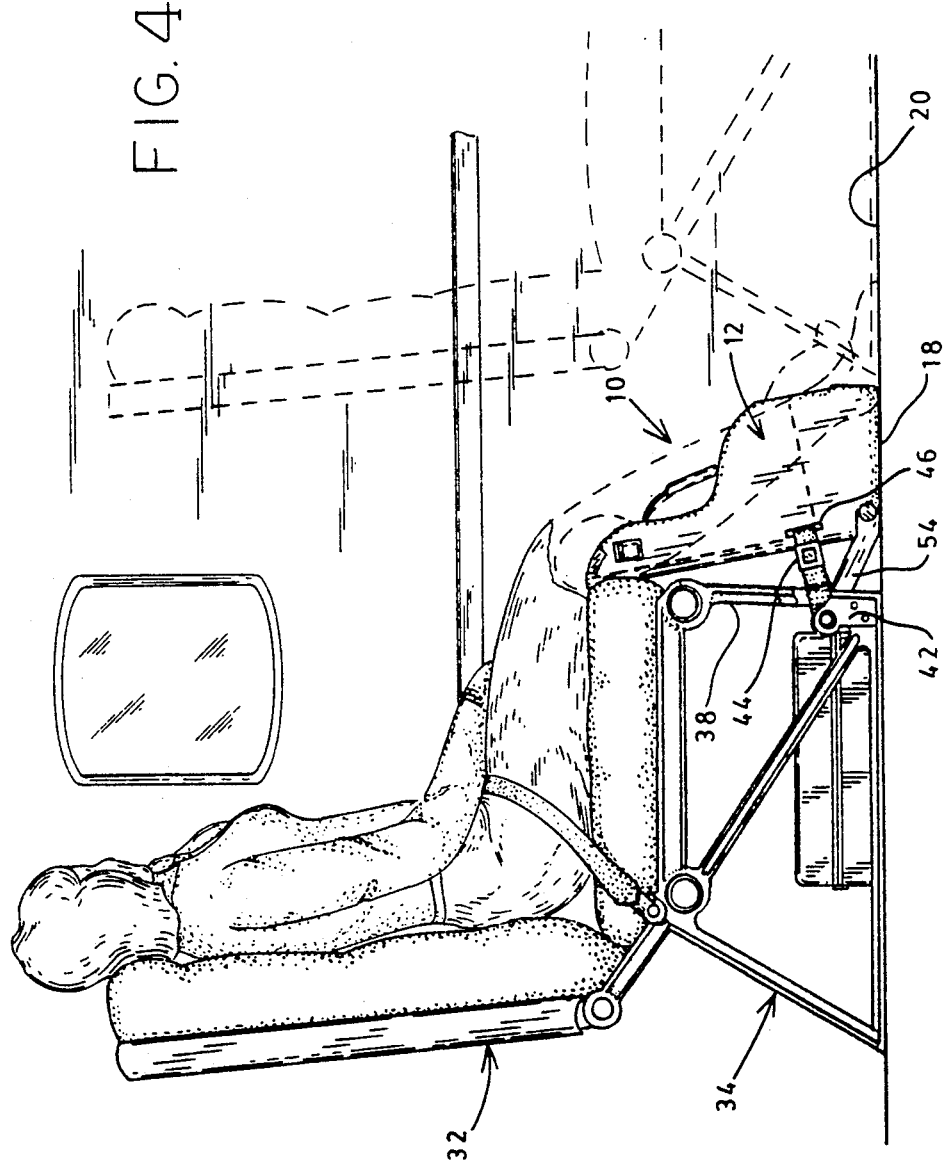

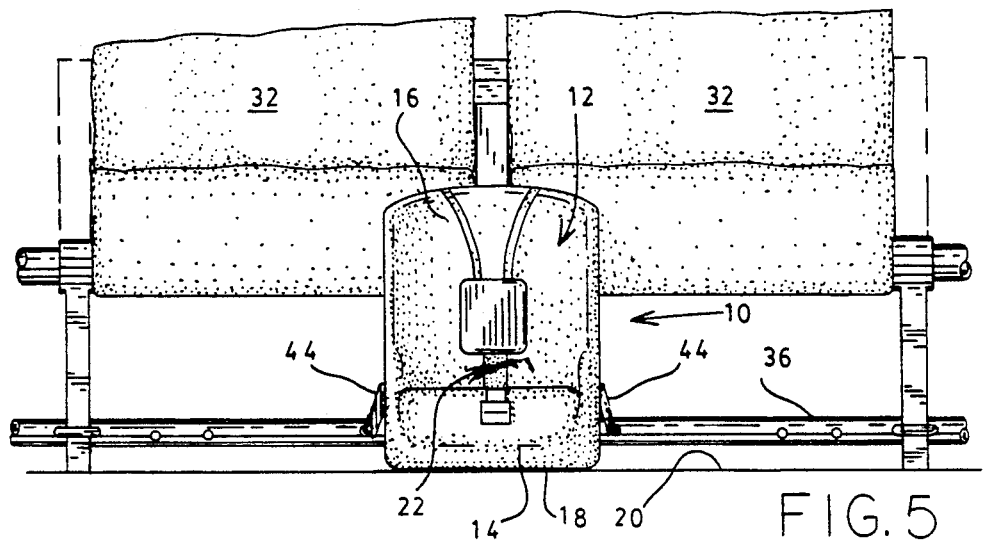
FIG. 5
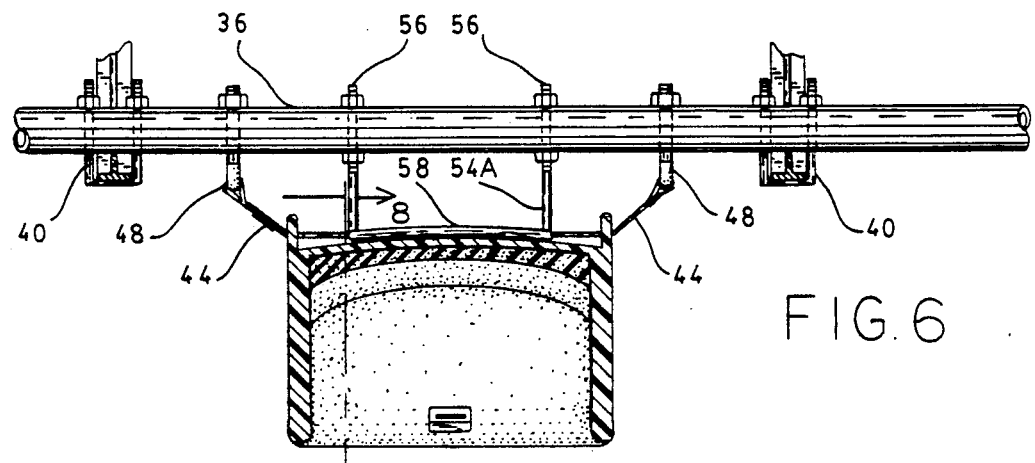
FIG. 6
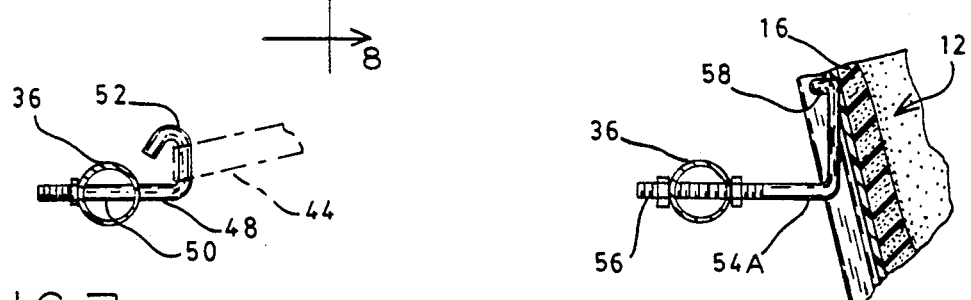
FIG. 7
FIG. 8

CHILD RESTRAINT SEAT FOR AN AIRCRAFT

TECHNICAL FIELD

This invention relates a child restraint seat for an aircraft. In this particular invention the seat includes a seat body with means for securing the seat body to a preselected support structure of the aircraft.

BACKGROUND ART

For many years it has been a common practice of the various airline companies to allow infants and young children to ride on airplanes at no cost when the infant or child is held in a parent or other adult's lap during flight, and does not occupy a separate seat. However, this practice results in the infant or child not having access to a seat belt, thus, greatly increasing the risk of death or injury should an accident occur. Therefore, in recent years the practice of children being held on an adult's lap during airline flights has come under attach. It is urged by many that all children even below a certain age be require to be seated, at least during takeoffs and landings, in a child restraint seat such as those commonly used in automobiles. However, conventional child restraint seats are designed to be secured in a passenger seat, and use of such restraint seats would necessarily result in the need for an additional airline ticket since the child would be occupying a separate seat.

Therefore, it is an object of the present invention to provide a child restraint seat which is releasably secured to a supporting structure of an aircraft in such a manner that it does not occupy a separate passenger seat.

It is another object of the present invention to provide a child restraint seat for safely restraining a child during flight so as to decrease the risk of death or injury should an accident occur.

Yet another object of the present invention is to provide a child restraint seat which can be quickly and easily installed in an aircraft.

Still another object of the present invention is to provide a child restraint seat which is inexpensive to manufacture and maintain.

DISCLOSURE OF THE INVENTION

Other objects and advantages will be accomplished by the present invention which provides a child restraint seat for an aircraft. The child restraint seat is designed to be releasably secured to a support structure of the aircraft, such as the under support of a passenger seat or a cabin partition, and comprises a seat body including a lower seat portion for supporting the child and a back portion for supporting the back of the child. The lower seat portion defines a seat bottom for supporting the child restraint seat on the floor of the aircraft. A child restraint harness is provided for securing the child in a seated position in the seat body, and a means for releasably securing the seat body to the support structure of the aircraft is also provided.

BRIEF DESCRIPTION OF THE DRAWINGS

The above mentioned features of the invention will be more clearly understood from the following detailed description of the invention read together with the drawings in which:

FIG. 4 illustrates a side elevation view of a child restraint seat of the present invention.

FIG. 5 illustrates a front view of a child restraint seat of the present invention.

FIG. 6 illustrates a plan view, in section, of a child restraint seat of the present invention.

FIG. 7 is a partial side elevation view of means for securing the child restraint seat of the present invention to an aircraft seat.

FIG. 8 is a partial side elevation view of means for securing the child restraint seat of the present invention to an aircraft seat.

BEST MODE FOR CARRYING OUT THE INVENTION

Figure 1:
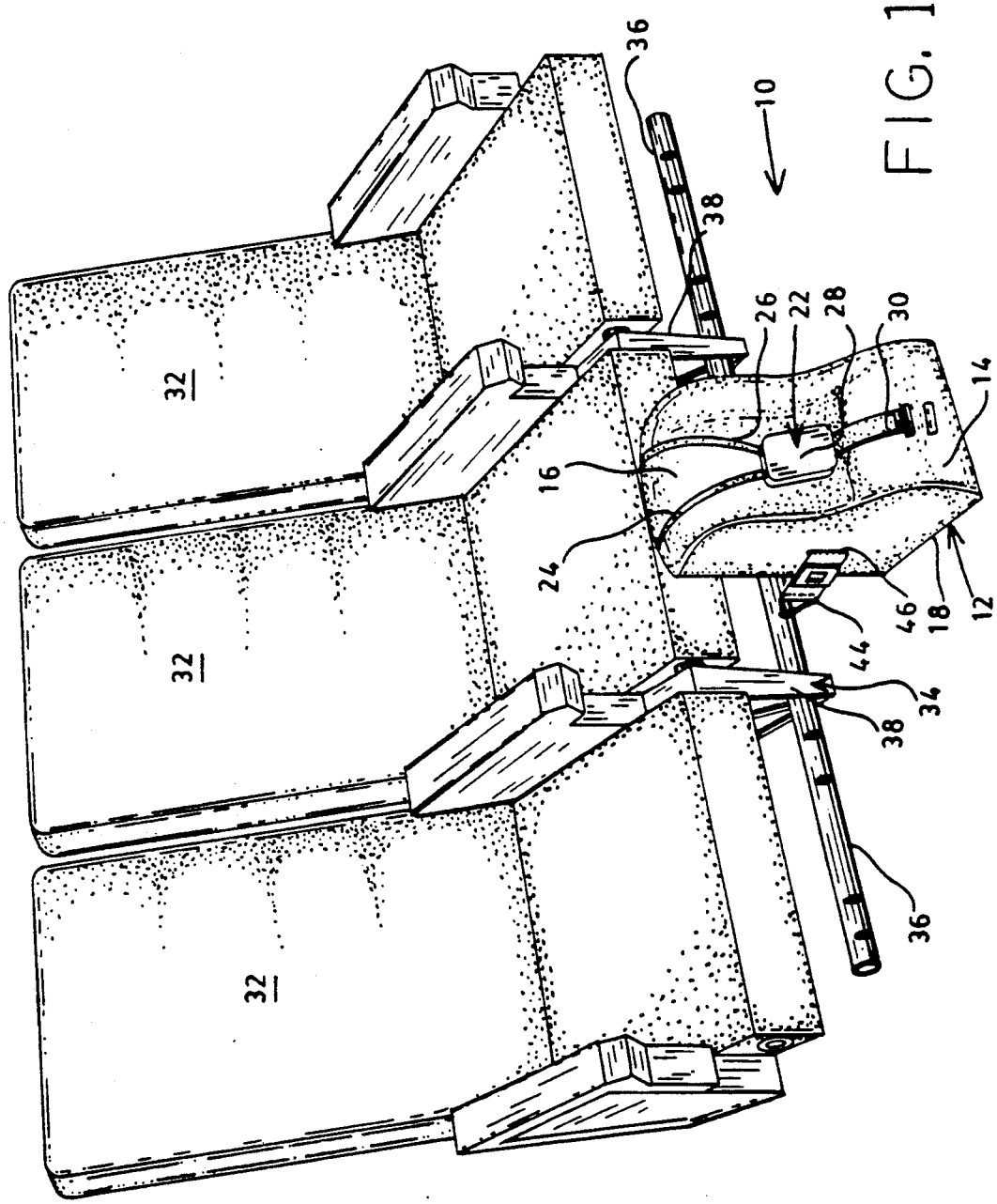
FIG. 1 illustrates a perspective view of a child restraint seat of the present invention as it is releasably secured to the passenger seats of an aircraft.

A child restraint seat for an aircraft incorporating various features of the present invention is illustrated generally at 10 in the Figures. The child restraint seat 10 is designed for quick and easy installation in an aircraft such as an airplane or helicopter. More specifically, the seat 10 is supported on the floor of the aircraft just forward of one or more passenger seat and is secured to the under support structure of the aircraft passenger seat in one embodiment and to a cabin partition in another embodiment.

The child restraint seat 10 comprises a body 12, including a lower seat portion 14 upon which the child sits and a back portion 16 for supporting the child's back. As illustrated in the Figures the lower seat portion 14 defines a seat bottom 18 which engages the floor 20 of the aircraft such that the child restraint seat is supported on the floor 20. Although the seat bottom 18 is illustrated as being in flush engagement with the floor 20 it will be appreciated that the bottom 18 can include legs or other support structures to effect engagement with the floor 20. However, in the preferred embodiment, it is contemplated that the seat bottom 18 will be disposed in relatively close proximity to the floor 20 of the aircraft.

The child restraint seat 10 also includes harness means 22 for securing the child in the seat 10. Typically such harness means 22 includes a pair of shoulder straps 24 and 26 which are received over the shoulders of the child and which are secured to a cushioned chest protecting member 28. The chest protecting member 28 is provided with a lower belt member 30 which extends between the legs of the child as the child is seated in the seat 10 and releasably engages the lower seat portion 14. Of course, the illustrated harness means 22 is illustrative of only one preferred harness means 22 and other suitable harness configurations can be used.

Figure 3:
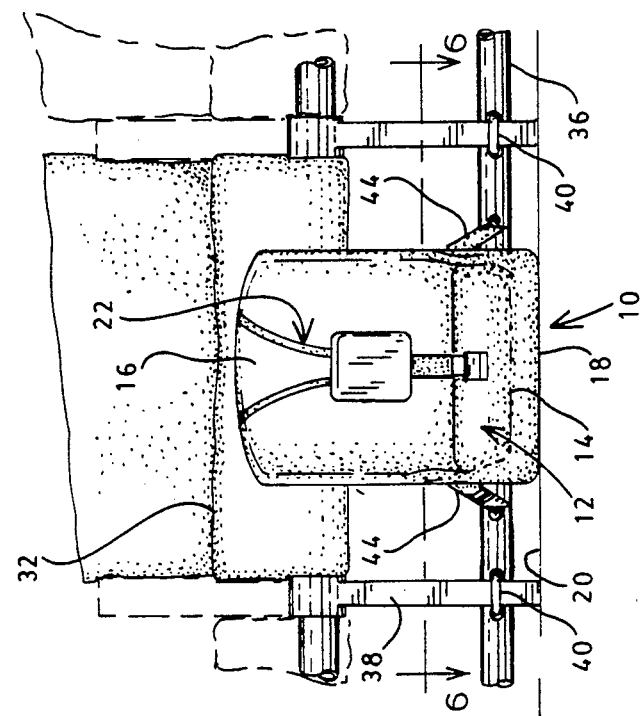
FIG. 3 illustrates a front view of a child restraint seat of the present invention.
Figure 2:
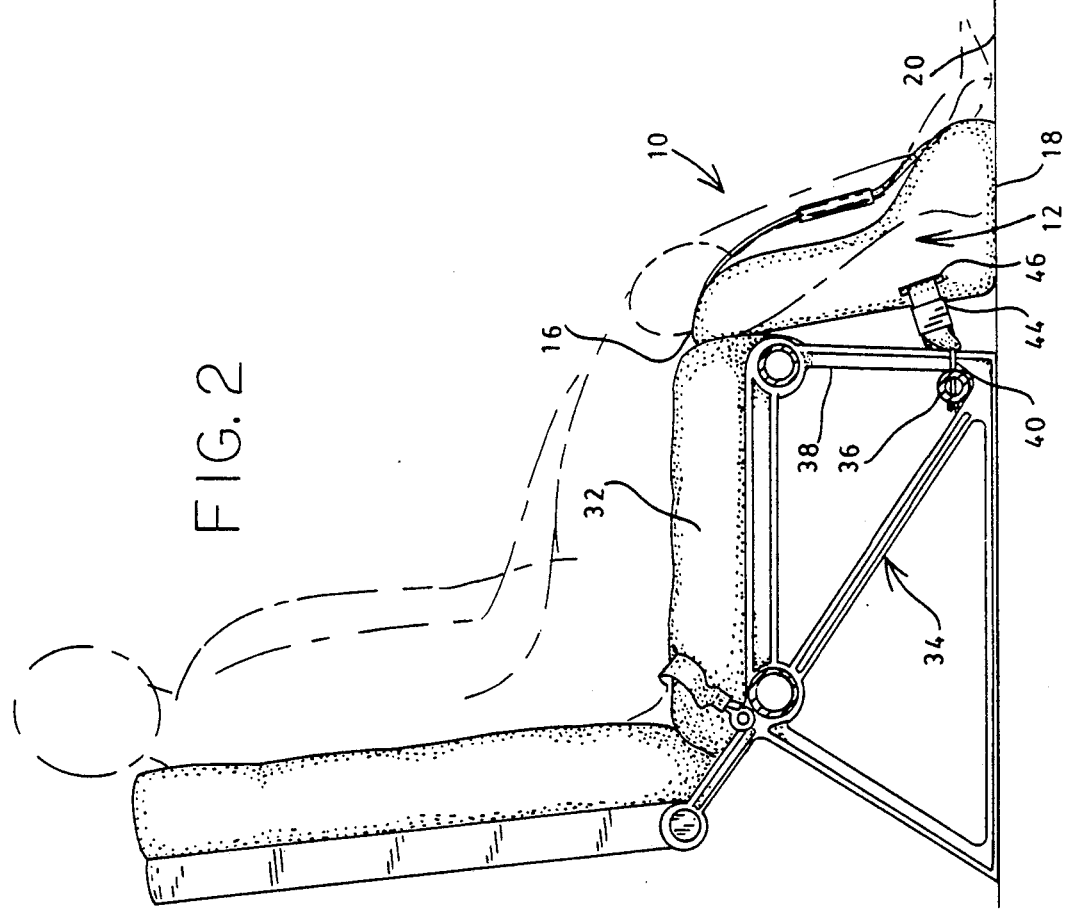
FIG. 2 illustrates a side elevation view of a child restraint seat of the present invention of the present invention.

As indicated above, the child restraint seat 10 is releasably secured to the under support structure 34 of one or more passenger seats 32. Accordingly, the seat 10 is provided with means for releasably securing the seat 10 to the under support structure 34. In one preferred embodiment an anchoring bar 36 is secured to the legs 38 of one or more of the passenger seats 32 with suitable fastening means, such as the clamp members 40 illustrated in FIGS. 2 and 3, or the end brackets 42 illustrated in FIG. 4.

The seat body 10 is secured to the anchoring bar 36 with belt means, which in the preferred embodiment includes the belt 44. The belt 44 is received through openings 46 provided in either side of the seat body 12, and the opposite ends of the belt 44 are releasably secured to the anchor bar 36. Various means can be used to secure the ends of the belt 44 to the anchor bar 36, but in the preferred illustrated embodiment a pair of hook members 48 are used. (See FIGS. 6 and 7). As illustrated, the stem portion 50 of the hook members 48 are received through holes provided in the anchor bar 36 and threadably secured to the bar with a suitable nut or other fastener. Further, the hook portion 52 of the hook members 48 are received in looped end portions provided at the opposite ends of the belt 44, thereby releasably securing the belt 44 to the hook members 48. Of course, it will be recognized that the belt 44 is preferably provided with means for adjusting its length such that the seat body 12 can be firmly secured to the anchor bar 36.

It will be recognized by those skilled in the art that aircraft passenger seats are commonly disposed in connected rows of two or three seats as illustrated in FIGS. 1 and 4. Where this is the case the anchor bar 36 can extent the length of the row of passenger seats, with holes being provided at preselected intervals, such that child restraint seats 10 can be positioned at any of the passenger seat locations. Moreover, as illustrated in FIG. 4, it may be desirable to secure the child restraint seat 10 to the anchor bar 36 such that it is centered between two passenger seats. This disposition of the seat 10 may be ideal where the child is traveling with two adults.

In the preferred embodiment the means for releasably securing seat 10 to the under support structure 34 also includes bracing means for limiting travel of the lower seat portion 14 in the direction of the passenger seat 32 to which the seat 10 is secured. In this regard, it will be recognized that when the seat 10 is properly positioned at least the upper portion of the back portion 16 of the seat 10 engages and is supported by the passenger seat 32 prohibiting rearward travel of the upper back portion 16, and forward travel of the seat 10 is prohibited by the means for releasably securing the seat 10 to the under support structure 34. However, travel of the lower seat portion 14 toward the operatively associated passenger seat 32 must also be prohibited to insure stable positioning of the seat 10.

In the illustrated embodiment of FIG. 4, the bracing means for limiting travel of the lower seat portion 14 includes at least one rigid member 54 which is secured at a first end to the lower seat portion 14 and at its other end to the anchor bar 36. Also, an alternative rigid member is illustrated at 54A in FIGS. 6 and 8. The rigid member 54A has selectively spaced threaded ends 56 which are received through holes provided in the anchor bar 36 and adjustably secured in position with a pair of nuts disposed on opposite sides of the anchor bar 36. The rigid member also has an outboard section 58 for engaging the rearward surface of the lower seat portion 14 prohibiting travel of the lower seat portion in the direction of the under support structure 34 of the operatively associated passenger seat.

Figure 9:
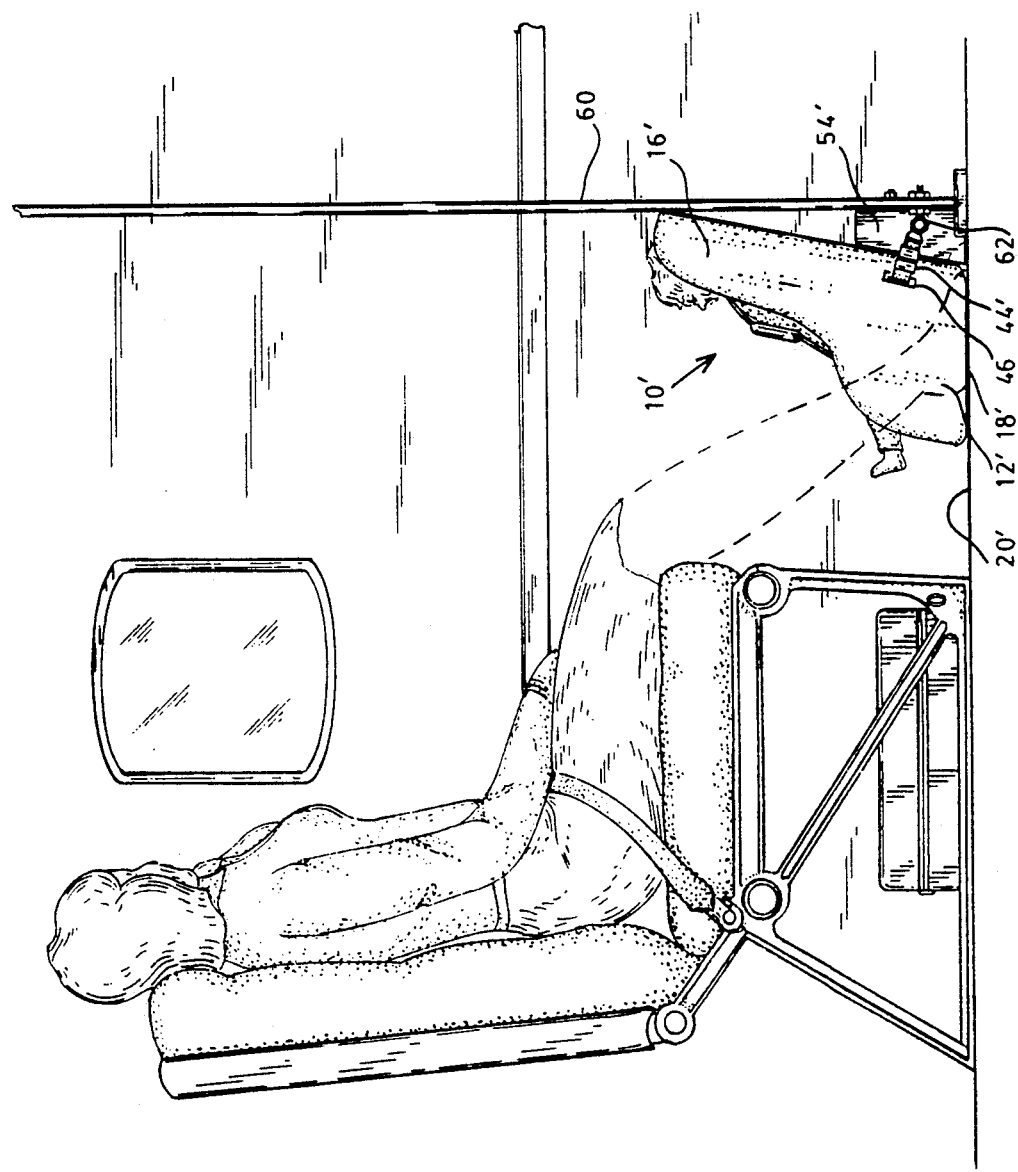
FIG. 9 is a side elevation view of an alternate embodiment of the child restraint seat of the present invention.

An alternate embodiment of the child restraint seat of the present invention is illustrated at 10' in FIG. 9. For convenience, features of the seat 10' which are common to the seat 10 described above are referenced with common prime numerals. As illustrated, the child restraint seat 10' is designed to be releasably secured and supported by a cabin partition 60, such partitions being commonly found in passenger aircraft. It will be noted that the ends of the belt 44' are releasable secured to fastening members 62 mounted on the partition 60. Further, a rigid member 54' is preferably disposed between the lower seat portion 14' and the partition 60, with the upper portion of the back portion 16' of the seat 10' engaging and being supported by the partition 60.

In light of the above it will be recognized that the present invention provides a child restraint seat for an aircraft having great advantages over the prior art. However, while a preferred embodiment has been shown and described, it will be understood that there is no intent to limit the invention to such disclosure, but rather it is intended to cover all modifications and alternate constructions falling within the spirit and scope of the invention as defined in the appended claims.

I claim:

1. A child restraint seat for an aircraft for being releasably secured to an under support structure of a passenger seat of said aircraft, said passenger seat including a lower seat portion supported by said under support structure for supporting a passenger, and including a back portion for supporting the back of said passenger, said child restraint seat comprising:

a seat body including a lower seat portion for supporting a child and a back portion for supporting the back of said child, said lower seat portion of said seat body being provided with means for engaging the floor of said aircraft such that said child restraint seat is supported on the floor of said aircraft;

harness means for securing said child in a seated position in said seat body; and means for releasably securing said seat body to said under support structure of said passenger seat of said aircraft, whereby said seat body is disposed forward of said passenger seat and whereby at least a portion of said back portion of said seat body engages, and is braced against, said lower seat portion of said passenger seat.

2. The child restraint seat of claim 1 wherein said means for releasably securing said seat body to said under support structure of said passenger seat includes an anchor bar for being secured to said under support structure of said passenger seat of said aircraft and includes a belt member secured to and extending between said seat body and said anchor bar.

3. The child restraint seat of claim 2 wherein said seat body includes oppositely disposed side portions each provided with at least one belt receiving opening, and wherein said belt member is received through said belt receiving openings and releasably secured at its opposite end portions to said anchor bar.

4. The child restraint seat of claim 3 wherein said means for engaging the floor of said aircraft includes a seat bottom defining a planar surface for facial abutment with said floor of said aircraft.

5. The child restraint seat of claim 2 wherein said back portion of said seat body defines an upper portion for engaging and being braced against said lower seat portion of said passenger seat, and wherein said child restraint seat further comprises bracing means for limiting the travel of said lower seat portion of said seat body in the direction of said under support structure of said passenger seat of said aircraft.

6. The child restraint seat of claim 1 wherein said back portion of said seat body defines an upper portion for engaging and being braced against said lower seat portion of said passenger seat, and wherein said child restraint seat further comprises bracing means for limiting the travel of said lower seat portion of said seat body in the direction of said under support structure of said passenger seat of said aircraft.

7. The child restraint seat of claim 1 wherein said means for engaging the floor of said aircraft includes a seat bottom defining a planar surface for facial abutment with said floor of said aircraft.

8. A child restraint seat for an aircraft for being releasably secured to a cabin partition of said aircraft, said aircraft having a passenger compartment provided with a floor, said child restraint seat comprising:
  a seat body including a lower seat portion for supporting said child and a back portion for supporting the back of said child, said lower seat portion being provided with means for engaging the floor of said aircraft whereby said child restraint seat is supported on said floor of said passenger compartment;
  harness means for securing said child in a seated position in said seat body; and
  means for releasably securing said seat body to said cabin partition of said aircraft, whereby at least a portion of said back portion of said seat body engages, and is braced against, said cabin partition.

9. The child restraint seat of claim 8 wherein said means for releasably securing said seat body to said cabin partition of said aircraft includes a pair of fastening members for being secured to said cabin partition of said aircraft and includes a belt member secured to and extending between said seat body and said fastening members.

10. The child restraint seat of claim 8 wherein said back portion of said seat body defines an upper portion for engaging and being braced against said cabin partition, and wherein said child restraint seat further comprises bracing means for limiting the travel of said lower seat portion in the direction of said cabin partition of said aircraft.

11. The child restraint seat of claim 8 wherein said means for engaging the floor of said aircraft includes a seat bottom defining a planar surface for facial abutment with said floor of said aircraft.

12. The child restraint seat of claim 9 wherein said seat body includes oppositely disposed side portions each provided with at least one belt receiving opening, and wherein said belt member is received through said belt receiving openings and releasably secured at its opposite end portions to one of said fastening member.

13. A child restraint seat for an aircraft for being releasably secured to an under support structure of a passenger seat of said aircraft, said passenger seat including a lower seat portion supported by said under support structure for supporting a passenger, and including a back portion for supporting the back of said passenger, said child restraint seat comprising:
  a seat body including a lower seat portion for supporting said child and a back portion for supporting the back of said child, said lower seat portion of said seat body being provided with means for engaging the floor of said aircraft whereby said child restraint seat is supported on the floor of said aircraft, said seat body including oppositely disposed side portions each provided with at least one belt receiving opening;
  harness means for securing said child in a seated position in said seat body;
  means for releasably securing said seat body to said under support structure of said passenger seat of said aircraft, said means for releasably securing said seat body including an anchoring bar for being secured to said under support structure of said passenger seat, and a belt member for being received through said belt receiving openings of said seat body and releasably secured at its opposite ends to said anchoring bar, whereby said seat body is disposed forward of said passenger seat and whereby at least an upper portion of said back portion of said seat body engages, and is braced against, said lower seat portion of said passenger seat; and
  bracing means for limiting the travel of said lower seat portion of said seat body in the direction of said under support structure of said passenger seat.

14. The child restraint seat of claim 13 wherein said means for engaging the floor of said aircraft includes a seat bottom defining a planar surface for facial abutment with said floor of said aircraft.

15. A child restraint seat for an aircraft for being releasably secured to a cabin partition of said aircraft, said child restraint seat comprising:
  a seat body including a lower seat portion for supporting said child and a back portion for supporting the back of said child, said lower seat portion being provided with means for engaging the floor of said aircraft whereby said child restraint seat is supported on the floor of said aircraft, said seat body including oppositely disposed side portions each provided with at least one belt receiving opening;
  harness means for securing said child in a seated position in said seat body;
  means for releasably securing said seat body to said cabin partition of said aircraft whereby at least an upper portion of said back portion of said seat body engages, and is braced against, said cabin partition, said means for releasably securing said seat body including at least a pair of fastening members mounted on said cabin partition, and a belt member received through said belt receiving openings of said seat body and releasably secured at its opposite ends to said fastening members; and
  bracing means for limiting the travel of said lower seat portion in the direction of said cabin partition.

16. The child restraint seat of claim 15 wherein said means for engaging the floor of said aircraft includes a seat bottom defining a planar surface for facial abutment with said floor of said aircraft.

* * * * *